UNITED STATES PATENT OFFICE 1,986,700

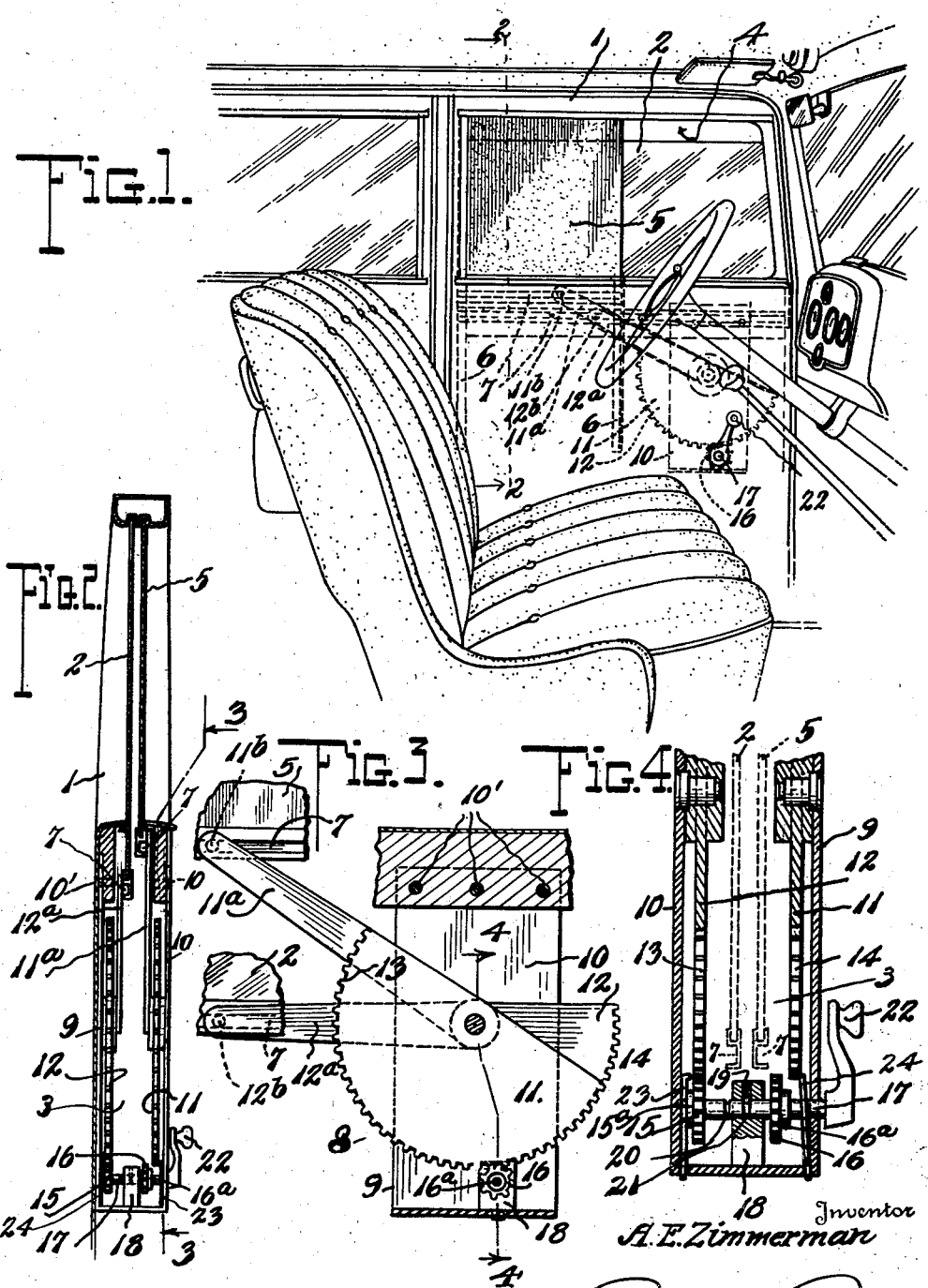
Jan. 1, 1935.     A. E. ZIMMERMAN     1,986,700
WEATHER SHIELD FOR AUTOMOBILES
Filed May 31, 1932

WEATHER SHIELD FOR AUTOMOBILES

Axel E. Zimmerman, West Palm Beach, Fla., assignor of one-third to Fred A. Franck, La Follette, Tenn.

Application May 31, 1932, Serial No. 614,572

4 Claims. (Cl. 296—44)

This invention relates to improvements in weather shields for automobiles and more particularly to shields which are associated with the automobile window and door openings for the purpose of excluding rain, sun, cold, drafts, etc., from the interior of the automobile.

An object of the invention is the provision of a weather shield of the above type which is readily movable into shielding position to close a portion of the window opening independently of the usual window glass.

A further object is the provision of a shield which is readily shifted into shielding position to effectively protect the driver of an automobile from the heat and glare of the sun's rays while at the same time not materially obstructing his driving vision.

A still further object is the provision of a weather shield which is slidably mounted within the automobile door and disposed to be raised or lowered at will by the driver or operator and utilizing the same means for operating the weather shield and the usual window glass or closure for the door.

Another object is the arrangement of the weather shield with respect to the usual window glass in automobile windows so that the weather shield when raised to its closed position will close substantially half of the window to provide a sunshade while the main window glass may be opened or closed to vary the size of the opening of the other part of the window.

A further objective is an improved form of combined actuator for automobile windows having a plurality of parallel shiftable glasses in an automobile window frame having common means to cause the actuator to selectively shift the windows.

A still further object is the provision of a weather shield more especially designed for the front doors of automobiles which comprises an opaque shield member slidably disposed interiorly of and adjacent to the regular window glass so as to be shiftable to close substantially that half of the window next the driver's seat to provide an effective sun and weather shield while at the same time not materially interfering with the vision through the other portion of the window.

Other and further objects and advantages of the invention will be hereinafter set forth and the novel features thereof defined by the appended claims.

In the drawing:

Fig. 1 is a fragmentary perspective view of the interior of a portion of an automobile looking towards the driver's seat and disclosing my improved form of weather shield applied to the left hand automobile door;

Fig. 2 is a vertical sectional view taken approximately on the line 2—2 of Fig. 1 but omitting the window and weather shield guides for the sake of clearness;

Fig. 3 is a fragmentary vertical sectional view taken on the line 3—3 of Fig. 2, and Fig. 4 is a vertical sectional view taken on the plane indicated by the line 4—4 of Fig. 3.

Like reference characters designate corresponding parts in the several figures of the drawing, in which 1 indicates an automobile door having the usual window glass 2 slidably disposed therein so as to move into the space 3 in the lower portion of the door when it is desired to open the window portion 4 of the door. Disposed interiorly of the usual window glass 2 in substantially close parallel relation thereto is my improved weather shield 5 which may be of any suitable opaque or semi-opaque material or if desired the shield may be made of such indestructible and non-transparent material as metal, rubber or bakelite composition.

Suitable guides 6 are disposed within the door 1 for properly supporting and guiding the closure 5 into its various positions. The lower edges of the weather shield 5 and the main glass 2 are provided with the usual window regulator channels 7 for engagement with my improved form of window regulator indicated generally at 8. This regulator comprises an angular sheet metal frame 9 suitably secured at 10 to the interior framework of the door 1. The vertical wall portions 10 of the angular frame 9 have pivotally secured thereto the window regulator segments 11 and 12. Segment 11 is provided with an arm 11a having a roller 11b disposed in the regulator channel 7 secured to the weather shield 5. The segment 12 is provided with a similar arm 12a somewhat shorter than the arm 11a. This arm 12a is also provided with a roller 12b for engagement with the window channel 7 on the main window closure or glass 2. As disclosed more clearly in Fig. 4 of the drawing the two segments 11 and 12 are spaced apart to permit the window glass and the weather shield to pass therebetween as seen in dotted lines in this figure. The arcuate edges of the segments 11 and 12 are provided with the usual rack or teeth 13 and 14 adapted to mesh with a pair of pinions 15 and 16 fixed to the regulator operating shaft 17 slidably carried in the lower portion of the frame 9.

The pinions 15 and 16 are preferably spaced somewhat closer together than the segments 11 and 12 so that by shifting the shaft 17 longitudinally of its axis one or the other of the pinions 15 or 16 is brought into meshing relation with the teeth 13 or 14 on the regulator segments. The shaft 16 is preferably carried in a standard 18 having a spring detent 19 for engagement with one or the other of the grooves 20 or 21 around the shaft 16 depending upon which pinion and regulator segment are in mesh. The end of the operating shaft 17 extends interiorly of the door of the car and has secured thereto the usual operating crank 22. If desired the segments 11 and 12 may be provided with the usual type of balancing springs to equalize the weight of the windows and prevent accidental displacement thereof.

To insure against the possible lowering of either window by gravity or jolting after disengaging pinion, a small ratchet is attached unobtrusively on the outer ends of shaft 17 adjacent the respective racks 11 and 12.

While I have disclosed the weather shield as applied to the driver's door of the automobile it is to be understood that this shield also may be applied to the other doors and windows of the automobile if it is so desired.

Fig. 1 of the drawing shows my weather shield in its fully raised position effectively closing the rear half of the door window, the main window 2 being open sufficiently to allow for ventilation of the car.

In driving in rain with the windows and weather shield in substantially this position it should be observed that the driving rain is effectively prevented from driving through the space adjacent the rear half of the door and wetting the occupants sitting on the rear seat of the automobile. Also with the shield in this position the driver is shielded from the sun's rays and when desired the operating crank 22 may be turned to lower the main glass 2 so the operator may thrust his hand out of the window for signalling purposes without disturbing the weather shield 5.

When it is desired to operate the main window glass 2 the operator grasps the crank 22 and moves the shaft 17 to cause the pinion 15 to engage the arcuate rack 14 of the segment 12. By rotating the crank 22 the main glass may be raised or lowered as desired.

Rotation of the shaft 17 by the crank will adjust the weather shield to the desired position in the window opening.

While the specific details of construction have been herein shown and described, the invention is not confined thereto as changes and alterations may be made without departing from the spirit thereof as defined by the appended claims.

Having thus described my invention what I claim as new and desire to secure by Letters Patent is:

1. In an automobile window construction, a casing having a window opening, a window glass slidable in said opening to more or less close the same, an actuating rack at one side of said casing having operating connection with the glass, an opaque shield member mounted in the casing and movable to occupy the rear of the window opening for more or less masking said rear portion, said window glass and shield when in operative position being parallel to one another, a rack member at the other side of the casing from that occupied by the first mentioned rack member and operatively connected with the shield aforesaid, and an actuating shaft arranged transversely of the casing and having gear elements shiftable to engage one or the other of said rack members, whereby to shift either the glass or shield to or from the window opening.

2. In an automobile window construction of the class described, a casing having a window opening, a window glass slidably disposed in said opening to close the entire opening, an opaque weather shield disposed in spaced parallel relation to said glass to variably close the rear portion of said opening when the glass is in either open or closing position relative thereto, said glass and shield having an operating element connected to each, and an operating means engageable with either of said operating elements for sliding said shield and said window glass to vary the window opening.

3. In automobile window construction of the class described, a window casing having a window frame thereabove, a window glass slidably disposed in said casing and frame, operating means on said glass for moving said glass to close the window opening, an opaque weather shield slidably disposed in said casing and frame inside of the window and being of a lesser width than the glass so as to only partly close the window opening when fully raised, operating means on said shield for moving said weather shield into and out of said casing, and an actuator for selectively engaging said window glass and weather shield moving means according to whether one or the other is to be rendered operative in the window opening.

4. In automobile window construction, the combination with a window frame having a window opening and a pair of parallel window closure members movable into the opening, one of said members being opaque and disposed to shield the rear section of the window only, of an actuating means for said closure members comprising a pair of spaced parallel window regulator operating members, each formed with an arcuate rack, a support therefor, an operating shaft journaled in said framework and having fixed thereon a pair of spaced pinions, the space between the pinions being less than the space between the regulator operating members and an operating handle fixed to the shaft for sliding the shaft to selectively mesh said pinions with said racks on the regulator operating members and for rotating the shaft.

AXEL E. ZIMMERMAN.